US012782751B2

(12) United States Patent
Leon

(10) Patent No.: US 12,782,751 B2
(45) Date of Patent: Nov. 3, 2026

(54) HANGER FOR EYEWEAR

(71) Applicant: Troy Bernard Leon, Sydney (CA)

(72) Inventor: Troy Bernard Leon, Sydney (CA)

( * ) Notice: Subject to any disclaimer, the term of this patent is extended or adjusted under 35 U.S.C. 154(b) by 225 days.

(21) Appl. No.: 18/754,153

(22) Filed: Jun. 26, 2024

(65) Prior Publication Data

US 2026/0003207 A1 Jan. 1, 2026

(51) Int. Cl.
*G02C 3/02* (2006.01)

(52) U.S. Cl.
CPC .................................... *G02C 3/02* (2013.01)

(58) Field of Classification Search
None
See application file for complete search history.

(56) References Cited

U.S. PATENT DOCUMENTS 4,549,793 A * 10/1985 Yoon .................... A42B 1/247 351/123
4,636,048 A * 1/1987 Jones .................... A42B 1/247 351/155
5,355,185 A * 10/1994 Lee .................... G02C 3/003 351/158
6,757,914 B1 * 7/2004 Kobashikawa ......... A61F 9/027 2/10
7,051,406 B1 * 5/2006 Morris .................... G02C 3/02 24/3.12
2015/0077698 A1 * 3/2015 Frank .................... G02C 3/02 351/156

* cited by examiner

*Primary Examiner* — Robert E. Tallman
(74) *Attorney, Agent, or Firm* — Capehart Law Firm

(57) ABSTRACT

A hanger suitable for storing an eyewear on a hat or a head of a person includes a holder for holding the eyewear, and a pair of engagement structures. The engagement structures extend in a longitudinal direction from the holder and coupled to the holder. Further, the engagement structures are arranged spaced apart from each other, and the holder extends in a lateral direction between the pair of engagement structures. Moreover, the engagement structures are adapted to engage with the hat or the head and secure the holder to the hat or the head of the person.

9 Claims, 3 Drawing Sheets

HANGER FOR EYEWEAR

BACKGROUND OF THE INVENTION

The present disclosure relates, generally, to a hanger, and more particularly relates to a hanger suitable for attachment to a hat or cap and adapted to securely hold an eyewear with the hat arranged on a head of a user.

The storage of eyewear when not in use is a continual problem. Some people wear eyewear at the back of a hat when not in use. However, eyewear, when arranged and stored at the back of hat, has a tendency to fall, which is undesirable.

SUMMARY OF THE INVENTION

In one aspect of the disclosure, a hanger is disclosed. The hanger is suitable for storing an eyewear on a hat or a head of a person. The hanger includes a holder for holding the eyewear, and a pair of engagement structures extending in a longitudinal direction from the holder and coupled to the holder. The engagement structures are arranged spaced apart from each other, and the holder extends in a lateral direction between the pair of engagement structures. The engagement structures are adapted to engage with the hat or the head and secure the holder to the hat or the head of the person.

In some additional, alternative, or selectively cumulative embodiments, the holder includes an elongated rod extending in the lateral direction and having a first end and a second end. The holder also includes a first retention rod coupled to the first end of the elongated rod and arranged vertically offset from the elongated rod. Moreover, the holder includes a second retention rod coupled to the second end of the elongated rod and arranged vertically offset from the elongated rod. The first retention rod and the second retention rod support the eyewear.

In some additional, alternative, or selectively cumulative embodiments, the first retention rod and the second retention rod extend obliquely and outwardly in a direction away from the elongated rod.

In some additional, alternative, or selectively cumulative embodiments, the holder further comprises a first connecting rod extending in a vertical direction from the first end of the elongated rod to the first retention rod, connecting the first retention rod to the elongated rod. The holder also comprises a second connecting rod extending in the vertical direction from the second end of the elongated rod to the second retention rod, connecting the second retention rod to the elongated rod.

In some additional, alternative, or selectively cumulative embodiments, each of the first connecting rod and the second connecting rod extends obliquely downwardly from the elongated rod in a direction away from a central longitudinal axis of the hanger.

In some additional, alternative, or selectively cumulative embodiments, each of the pair engagement structures includes a first rod portion extending obliquely upwardly in the longitudinal direction from the holder, a second rod portion extending obliquely downwardly in the longitudinal direction from the first rod portion, and a third rod portion extending, in the longitudinal direction, away from the second rod portion.

In some additional, alternative, or selectively cumulative embodiments, the third rod portion includes an arch shape.

In some additional, alternative, or selectively cumulative embodiments, the third rod portion is configured to flex in the lateral direction to enable the secure engagement of the hanger with the hat or the head.

In some additional, alternative, or selectively cumulative embodiments, the holder includes a layer of non-slip coating.

In some additional, alternative, or selectively cumulative embodiments, each of the pair of engagement structures includes a layer of non-slip coating.

DETAILED DESCRIPTION

Figure 1:
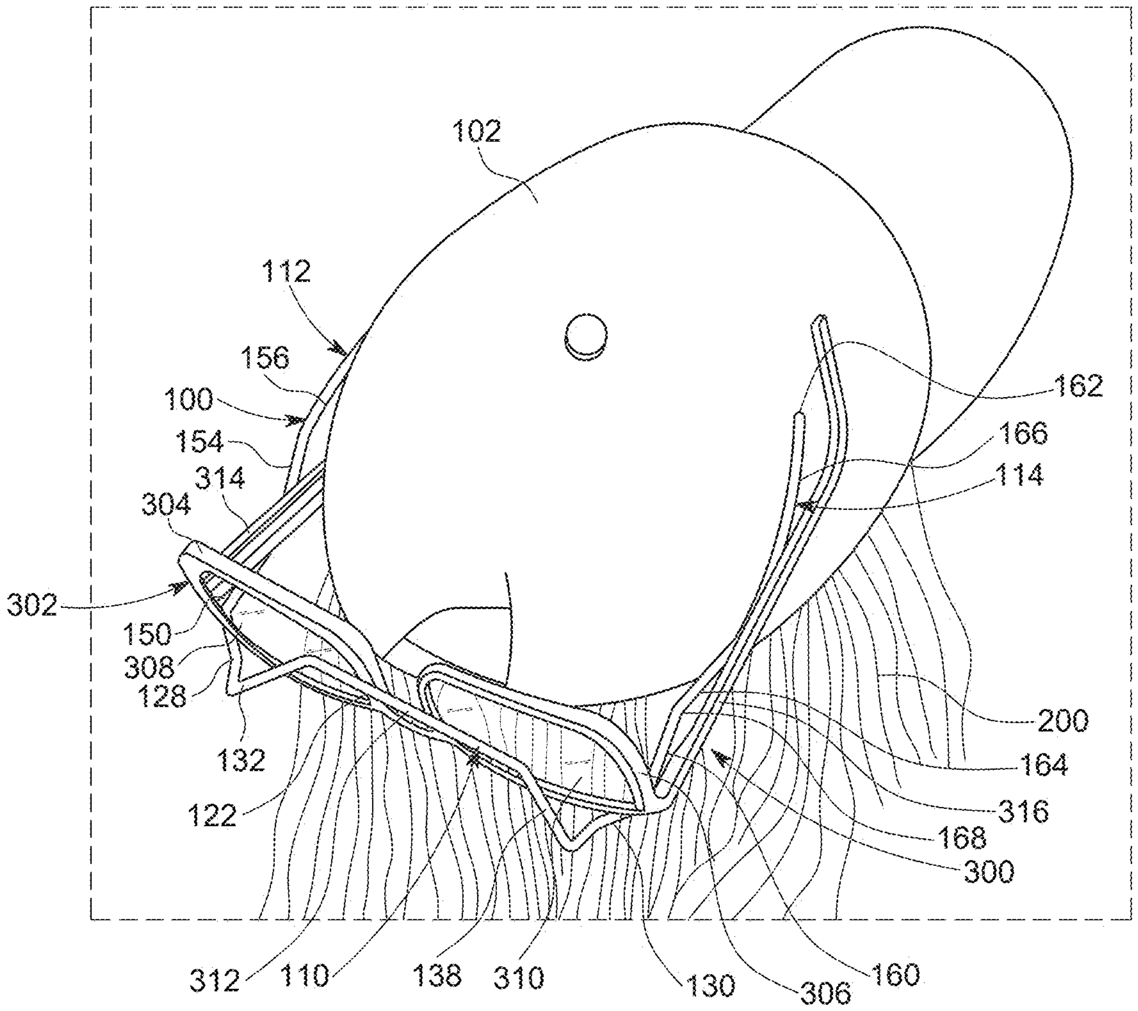
FIG. 1 illustrates a top perspective view of a hanger coupled to a hat arranged on a head of a user with an eyewear supported or stored on the hanger, in accordance with an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Figure 2:
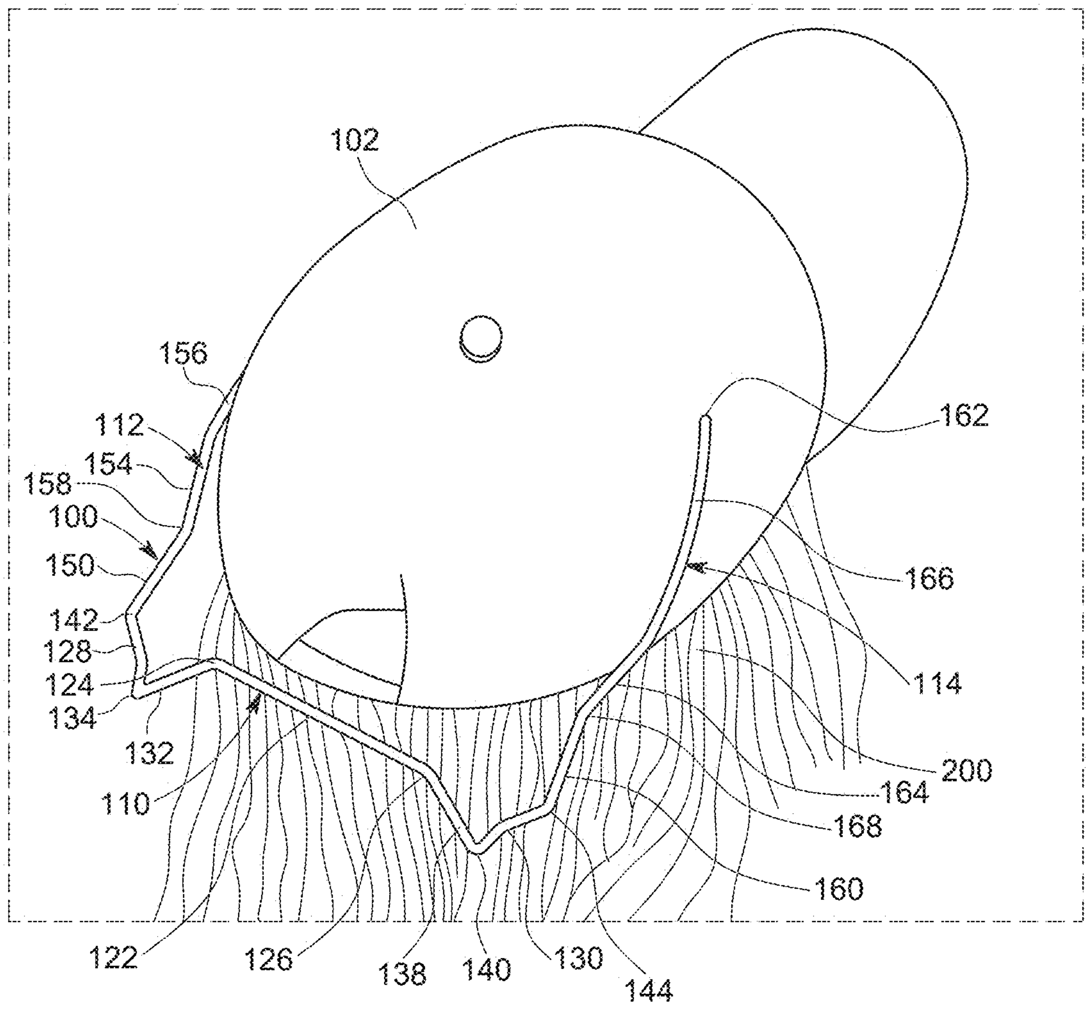
FIG. 2 illustrates a top perspective view of the hanger of FIG. 1 coupled to the hat arranged on the head of the user.
Figure 3:
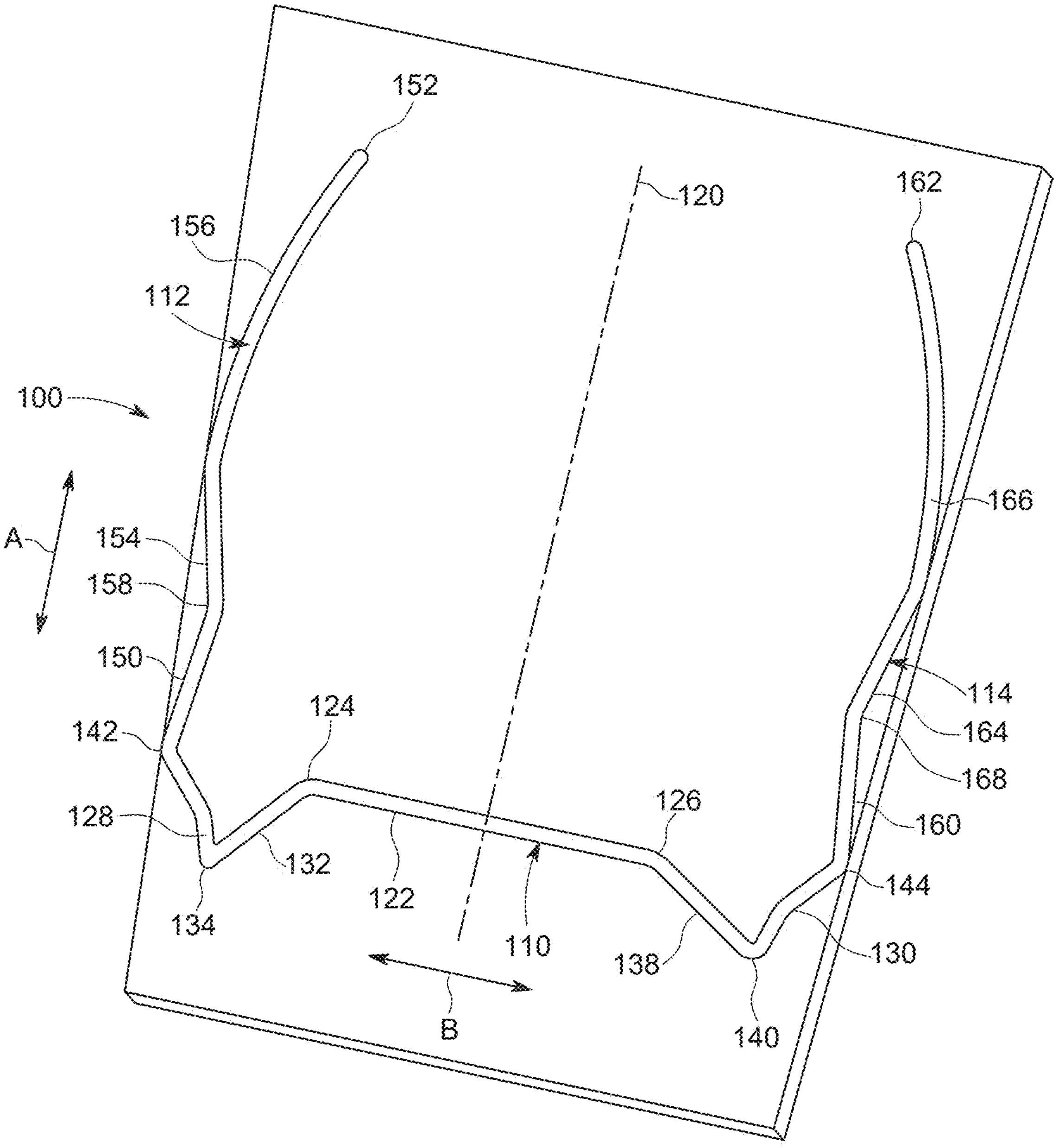
FIG. 3 illustrates a top perspective view of the hanger of FIG. 1 positioned on a flat surface, in accordance with an embodiment of the disclosure.

Referring to FIG. 1 to FIG. 3, a hanger 100 secured to a hat 102 arranged on a head 200 of a user, and retaining/holding an eyewear 300 with the head 200 of the user is shown. As shown, the eyewear 300 includes a frame 302 having a pair of rims 304, 306 supporting a pair of lenses 308, 310 and a bridge 312 connecting the pair of rims 304, 306 and adapted to rest on a nose of a user. The eyewear 300 also includes a pair of temples 314, 316 hinged to the pair of rims 304, 306 and configured to rest on the ears of the user to support the eyewear on the head 200 of the user with the lenses 308, 310 arranged in front of the eyes of the user.

As shown, the hanger 100 is configured to secure/hold the eyewear 300 to the hat 102 worn on the head of a user in a non-used/storage position of the eyewear 300. The non-used position refers to a position in which the lenses 308, 310 of the eyewear 300 are arranged at rear of the head 200 with temples 314, 316 extending forwardly along the sides of the head 200 or the hat 102. As shown, the hanger 100 includes a holder 110 to securely hold the frame 302, and hence the eyewear 300, in the storage position (i.e., non-used position) and a pair of engagement structures 112, 114 coupled to the holder 110 and configured to engage and secure the hanger 100 with the hat 102 and/or the head 200. As shown, the engagement structures 112, 114 are arranged spaced apart from each other and extends along the sides of the head 200 of user in the engagement of the hanger 100 with the head 200 or the hat 102 when the hat 102 is arranged on the head 200 of the user. It can be seen that the hanger 100 is symmetrical about its central longitudinal axis 120, shown in FIG. 3.

As shown, the holder 110 includes a lateral extending elongated rod 122 adapted to extend along a width of the hat 102 i.e., head 200 and includes a first end 124 and a second end 126. The elongated rod 122 acts as a stopper for eyewear

300 and prevents any rearward movement of the eyewear 300 when the eyewear 300 is mounted/arranged/held onto the hanger 100 in the storage position. Further, the holder 110 includes a pair of retention rods, for example, a first retention rod 128 and a second retention rod 130 arranged on opposite sides of the central longitudinal axis 120 and disposed vertically offset i.e., downwardly, from the stopper i.e., the elongated rod 122. As shown, the first retention rod 128 is coupled to the first end 124 of the stopper 122 and extends in a longitudinal direction 'A' relative to the stopper 122 that extends in a lateral direction 'B'. The first retention rod 128 is coupled/connected/attached to the first end 124 of the stopper 122 via a first connector rod 132. The first connector rod 132 of the holder 110 extends obliquely downwardly from the first end 124 of the stopper 122 to a first end 134 of the first retention rod 128. As shown, the first retention rod 128 also extends obliquely outwardly from the first connector rod 132 in a direction away from the central longitudinal axis 120.

Similar to the first retention rod 128, the second retention rod 130 is coupled to the second end 126 of the stopper 122 and extends in the longitudinal direction 'A' relative to the stopper 122. The second retention rod 130 is coupled/connected/attached to the second end 126 of the stopper 122 via a second connector rod 138. As illustrated, the second connector rod 138 extends obliquely downwardly from the second end 126 of the stopper 122 to a first end 140 of the second retention rod 130. Moreover, the second retention rod 130 extends obliquely outwardly from the second connector rod 138 in a direction away from the central longitudinal axis 120. The rims 304, 306 of the eyewear 300 rests on the retention rods 128, 130 when the eyewear 300 is arranged/held on the hanger 100.

Further, second ends 142, 144 of the retention rods 128, 130 are connected to the engagement structures 112, 114. As shown, the first engagement structure 112 is attached to the second end 142 of the first retention rod 128, while the second engagement structure 114 is attached to the second end 144 of the second retention rod 130. The engagement structures 112, 114 are arranged symmetrically about the central longitudinal axis 120.

As shown, the first engagement structure 112 includes a first rod portion 150 extending, in the longitudinal direction, from the first retention rod 128 towards a free end 152 of the first engagement structure 112, a second rod portion 154 extending from the first rod portion 150, in the longitudinal direction, towards the free end 152, and a third rod portion 156 extending from the second rod portion 154 to the free end 152, in the longitudinal direction. Accordingly, the second rod portion 154 is arranged between the first rod portion 150 and the third rod portion 156, while the first rod portion 150 is arranged between the first retention rod 128 and the second rod portion 154.

Referring to FIG. 3, the first rod portion 150 extends obliquely upwardly from the first retention rod 128, while the second rod portion 154 extends obliquely downwardly from the first rod portion 150. Accordingly, an intersection 158 of the first rod portion 150 and the second rod portion 154 is arranged at a vertical offset i.e., vertically upwardly, from the first retention rod 128. Accordingly, the first rod portion 150 acts as a stopper that prevents a movement of the eyewear 300 towards the free end 152 when the eyewear 300 is supported on the retention rods 128, 130 i.e., positioned on the holder 110.

Also, the third rod portion 156 may include an arch shape. The arrangement and structures of the second rod portion 154 the third rod portion 156 enable secure engagement/ retention of the first engagement structure 112, and hence the hanger 100, with the corresponding longitudinal side of the hat 102 or the head 200. It may appreciated that first engagement structure 112 is made of round flexible wire that enables flexing of the first engagement structure 112 in the lateral direction to secure the hanger 100 with the head 200 or the hat 102. The first engagement structure 112 i.e., the third rod portion 156 is adapted to flex lateral outwardly i.e., away from the central longitudinal axis 120, upon application of the flexing force and return to its original position upon removal of the flexing force. This enables the secure engagement of the first engagement structure 112 with the hat 102 or the head 200.

Similar to the first engagement structure 112, the second engagement structure 114 includes a first rod portion 160 extending from the second retention rod 130 towards a free end 162 of the second engagement structure 114, a second rod portion 164 extending, in the longitudinal direction, from the first rod portion 160 towards the free end 162, and a third rod portion 166 extending, in the longitudinal direction, from the second rod portion 164 to the free end 162. Accordingly, the second rod portion 164 is arranged between the first rod portion 160 and the third rod portion 166, while the first rod portion 160 is arranged between the second retention rod 130 and the second rod portion 164.

As best illustrated in FIG. 3, the first rod portion 160 extends obliquely upwardly from the second retention rod 130, while the second rod portion 164 extends obliquely downwardly from the first rod portion 160. Accordingly, an intersection 168 of the first rod portion 160 and the second rod portion 160 is arranged at a vertical offset i.e., vertically upwardly, from the second retention rod 130. In this manner, the first rod portion 160 acts as a stopper that prevents a movement of the eyewear 300 towards the free end 162 when the eyewear 300 is supported on the retention rods 128, 130 i.e., positioned on the holder 110.

Also, the third rod portion 166 may include an arch shape. The arrangement and structures of the second rod portion 164 the third rod portion 166 enable secure engagement/retention of the second engagement structure 114, and hence the hanger 100, with the corresponding longitudinal side of the hat 102 or the head 200. It may appreciated that second engagement structure 114 is made of round flexible wire that enables flexing of the second engagement structure 114 in the lateral direction to secure the hanger 100 with the head 200 or the hat 102. The second engagement structure 114 i.e., the third rod portion 166 is adapted to flex lateral outwardly i.e., away from the central longitudinal axis 120, upon application of the flexing force and return to its original position upon removal of the flexing force. This enables the secure engagement of the second engagement structure 114 with the hat 102 or the head 200. In some embodiments, the pair of engagement structures includes a layer of non-slip coating to prevent/reduce slipping of the hanger relative to the hat or head. Also, in some scenarios, the hanger may also include a layer of non-slip coating to reduce or prevent slippage of the eyewear relative to the holder. In some embodiment, the non-slip coating is rubberized non-slip coating.

It should be understood that the foregoing description is only illustrative of the aspects of the disclosed embodiments. Various alternatives and modifications can be devised by those skilled in the art without departing from the aspects of the disclosed embodiments.

The invention claimed is:

1. A hanger for storing an eyewear on a hat or a head of a person, the hanger comprising:

a holder for holding the eyewear, the holder includes an elongated rod extending in the lateral direction and having a first end and a second end, a first retention rod coupled to the first end of the elongated rod and arranged vertically offset from the elongated rod, and a second retention rod coupled to the second end of the elongated rod and arranged vertically offset from the elongated rod, wherein the first retention rod and the second retention rod support the eyewear; and a pair of engagement structures extending in a longitudinal direction from the holder and coupled to the holder, the engagement structures are arranged spaced apart from each other and the holder extends in a lateral direction between the pair of engagement structures, wherein the engagement structures are adapted to engage with the hat or the head and secure the holder to the hat or the head of the person.

2. The hanger of claim 1, wherein the first retention rod and the second retention rod extend obliquely and outwardly in a direction away from the elongated rod.

3. The hanger of claim 1, wherein the holder further comprises a first connecting rod extending in a vertical direction from the first end of the elongated rod to the first retention rod, connecting the first retention rod to the elongated rod, and a second connecting rod extending in vertical direction from the second end of the elongated rod to the second retention rod, connecting the second retention rod to the elongated rod.

4. The hanger of claim 3, wherein each of the first connecting rod and the second connecting rod extends obliquely downwardly from the elongated rod in a direction away from a central longitudinal axis of the hanger.

5. The hanger of claim 1, wherein each of the pair engagement structures includes a first rod portion extending obliquely upwardly in the longitudinal direction from the holder, a second rod portion extending obliquely downwardly in the longitudinal direction from the first rod portion, and a third rod portion extending away from the second rod portion in the longitudinal direction.

6. The hanger of claim 5, wherein the third rod portion includes an arch shape.

7. The hanger of claim 5, wherein the third rod portion is configured to flex in the lateral direction to enable the secure engagement of the hanger with the hat or the head.

8. The hanger of claim 1, wherein the holder includes a layer of non-slip coating.

9. The hanger of claim 1, wherein each of the pair of engagement structures includes a layer of non-slip coating.

* * * * *